Sept. 27, 1932.  D. J. ANGUS  1,880,008
GRAPHIC METER
Filed Oct. 27, 1928  3 Sheets-Sheet 1
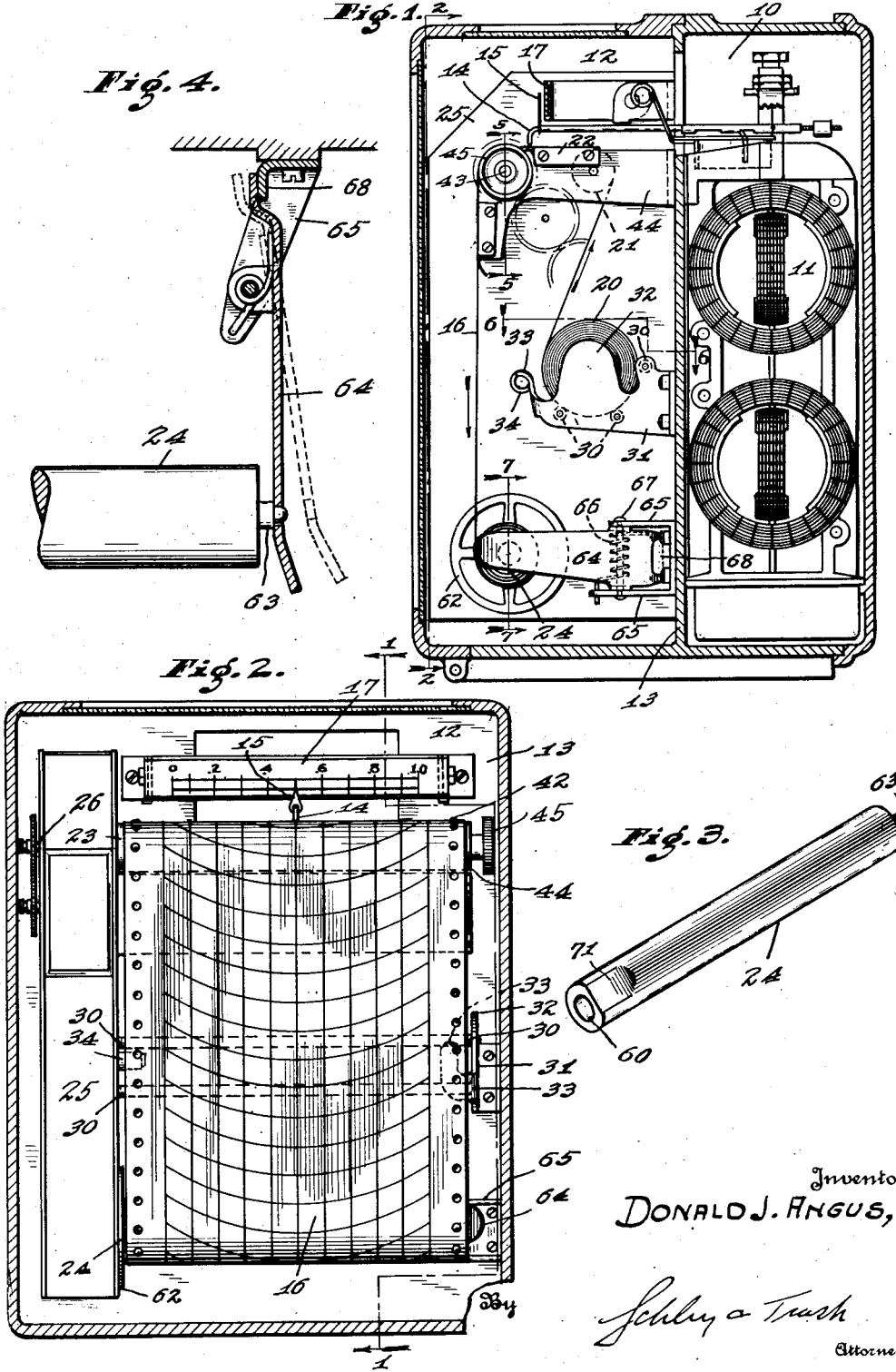
Inventor
DONALD J. ANGUS,
Schley & Trask
Attorneys Sept. 27, 1932.                D. J. ANGUS                1,880,008
GRAPHIC METER
Filed Oct. 27, 1928          3 Sheets-Sheet 2
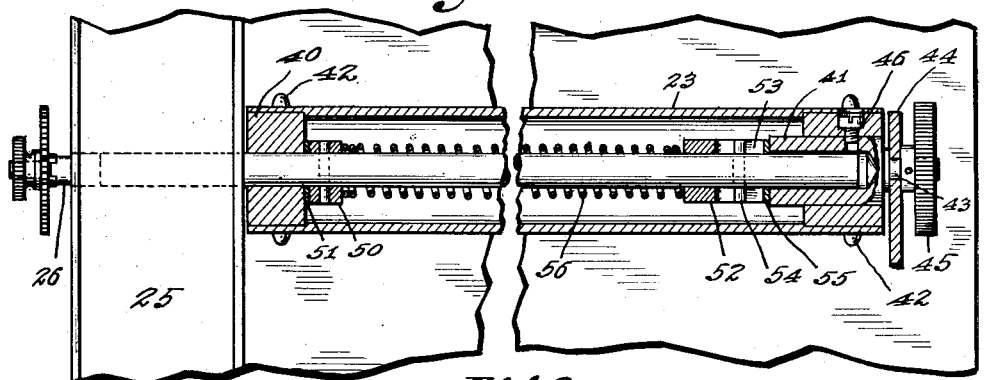
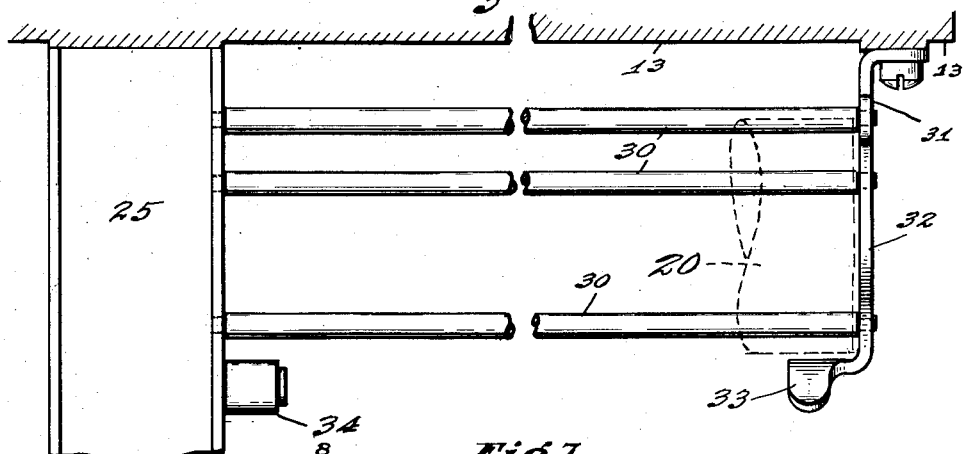
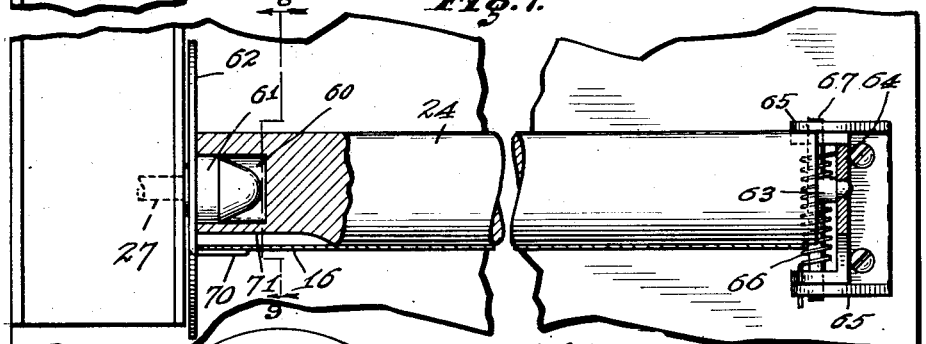
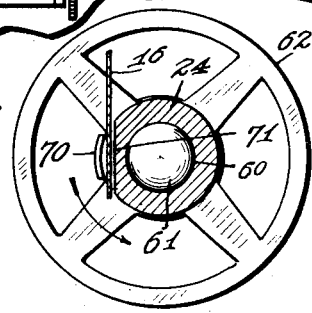
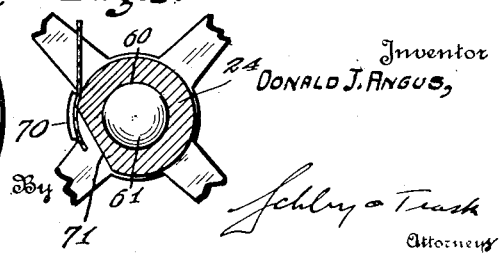
Inventor
DONALD J. ANGUS,
By Schley & Trask
Attorneys Sept. 27, 1932.  D. J. ANGUS  1,880,008
GRAPHIC METER
Filed Oct. 27, 1928   3 Sheets-Sheet 3

Inventor
DONALD J. ANGUS,

By
Attorneys

Patented Sept. 27, 1932

1,880,008

UNITED STATES PATENT OFFICE

DONALD J. ANGUS, OF INDIANAPOLIS, INDIANA

GRAPHIC METER

Application filed October 27, 1928. Serial No. 315,382.

My invention relates to graphic meters, and has for its object the improvement of certain constructional features of the paper-handling apparatus, in order to simplify the construction and reduce its cost, to better the general operation, to facilitate assembly, adjustment, disassembly, and repair of the apparatus, and to facilitate replacement, removal, and adjustment of the record-sheet rolls.

Figure 10:
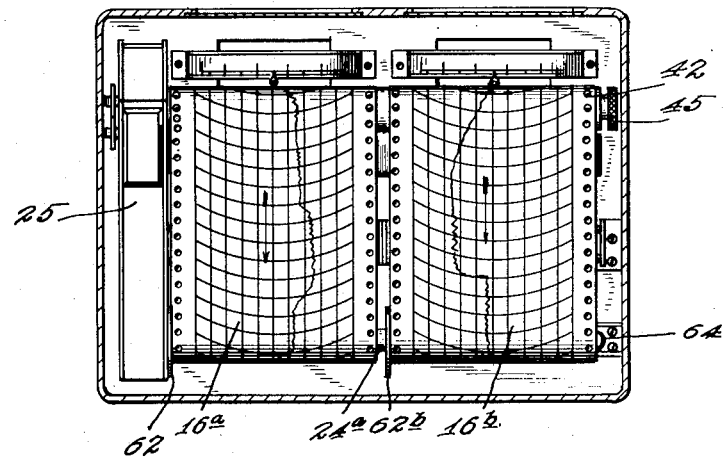

The accompanying drawings illustrate my invention. In such drawings: Fig. 1 is a vertical section through a simple meter embodying my invention, the section being taken substantially on the line 1—1 of Fig. 2; Fig. 2 is a vertical section on the line 2—2 of Fig. 1, showing the moving chart and associated elements in elevation; Fig. 3 is a perspective view of the re-roll roller, showing the paper-gripping notch at one end thereof; Fig. 4 is a fragmental view showing the mounting which permits removal of the re-roll roller; Fig. 5 is an enlarged vertical fragmental section, substantially on the line 5—5 of Fig. 1, showing the friction drive for the feed roll; Fig. 6 is an enlarged fragmental horizontal section substantially on the line 6—6 of Fig. 1, showing the basket support for the supply roll, and showing in dotted lines the supply roll of paper, partially broken away; Fig. 7 is an enlarged vertical fragmental section substantially on the line 7—7 of Fig. 1, showing the construction of the re-roll roller and its mounting; Figs. 8 and 9 are sections substantially on the line 8—9 of Fig. 7, showing the paper-gripping device in ungripping the gripping positions respectively; Fig. 10 is a front elevation of a duplex meter embodying features of my invention; and Figs. 11 and 12 are longitudinal sections through the duplex feed roll and the duplex re-roll roller for such duplex meter.

I have shown my invention in connection with a meter having a rear compartment 10 in which the operating mechanism or mechanisms 11 are mounted, and a front compartment 12 in which the recording mechanism or mechanisms are mounted. The two compartments are separated by a vertical partition 13. The actuating mechanism or mechanisms in the rear compartment 10 may be of any desired character, each suitable for operating a recording pen 14 and its attached pointer 15 over a moving record chart 16 and in front of a scale 17 respectively. In the duplex or multiple meter of Figs. 10, 11, and 12, there are two such pens 14, pointers 15, moving charts 16, and scales 17.

Figure 11:
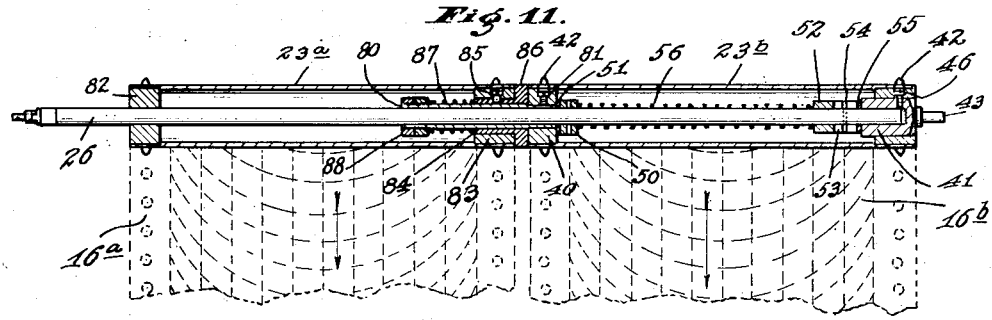
Figure 12:
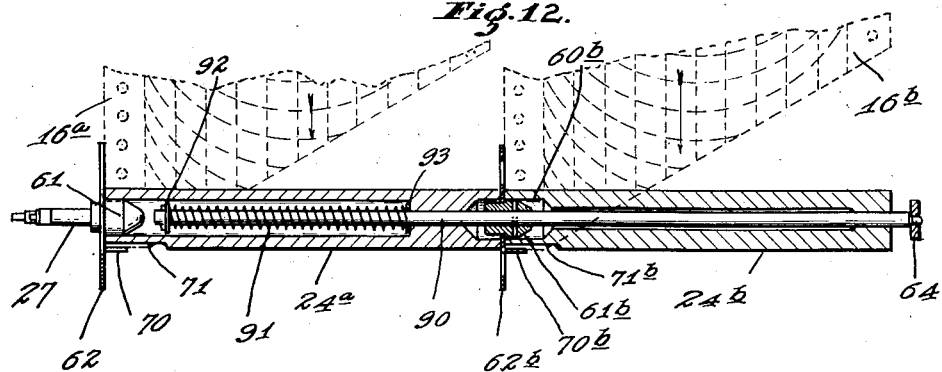

Such duplex meter of Figs. 10, 11, and 12, is in effect two single meters side by side, with their record charts driven in common; so that for simplicity I shall first describe my invention in connection with the simple meter of Figs. 1 to 9.

The record sheet 16 travels in the direction of the arrows from the supply roll 20 over an idler roller or rod 21, thence over a plate 22 which supports the record sheet while it receives the graph made by the pen 14, and then over a feed roller 23, from which it passes down to the re-roll roller 24.

The feed roller 23 and the re-roll roller 24 are driven by suitable clockwork mechanisms contained in a sub-case 25. The details of such clockwork mechanisms are immaterial to the present invention, save that one of them drives the power shaft 26 for the feed roller 23 at a definite speed, and the other drives the power shaft 27 for the re-roll roller 24 at whatever speed is necessary to keep slack out of the traveling record sheet.

Heretofore it has been customary to support the supply roll of record sheet on a shaft or roller; so that considerable work and loss of time was involved in putting in a new supply roll when one was exhausted. According to my present invention, I mount the supply roll 20 in a basket consisting primarily of three rods 30 extending between the clockwork sub-case 25 at one end of the supply roll and a supporting plate 31 at the other. The supporting plate 31 is carried by the partition 13, and has an upstanding ear 32 which serves to hold the supply roll 20 endwise in place between it and the sub-case 25. Two of the rods 30 are arranged with suitable spacing beneath the supply roll 20, and the third rod 30 is behind such supply roll, as is perhaps most clear from Fig. 1. In order to hold the supply roll in place in the basket at the front of the latter, while yet permitting ready insertion and removal of the supply roll, the supporting plate 31 at its forward end is provided with the finger 33 which lies in front of the supply roll 20 at one end thereof; and a roller 34 carried by the sub-case 25 lies in front of the other end of the supply roll. This is apparent from Figs. 1 and 6. With this construction, the operator may reach in between the roller 34 and the finger 33, whenever necessary to insert or remove a supply roll or manually to pull paper therefrom. This basket support makes it possible to remove and insert a supply roll very easily and quickly.

The feed roller 23 is driven from the power shaft 26 through a friction drive, which permits adjustment of the record sheet 16 with relation to the pen 14 without turning the power shaft 26 or releasing such power shaft from the clockwork mechanism which drives it. To this end, the feed roller 23 is made hollow, and is supported at its ends on collars 40 and 41 which are loose on the power shaft 26. The sheet-driving pins 42 conveniently project outward from these loose collars 40 and 41. The collar 41 is desirably provided with a trunnion 43 by which the feed roller may be given a steadying support from a carrying arm 44, in turn borne by the partition 13. Beyond the carrying arm 44, the trunnion 43 desirably has a knurled wheel 45 fastened to it for the operator to grasp to adjust the feed roll.

The loose collar 41 as shown is made in two parts, connected by a screw 46. It is the inner part which carries the trunnion 43. This inner part has an axial hole nearly through it to receive loosely the end of the drive shaft 26.

Between the loose collar 40 and the inner part of the loose collar 41 is a spring-actuated friction device which is rotatably fixed to the drive shaft 26. This friction device consists of a collar 50 which is pinned to the drive shaft 26 and is faced on the side toward the loose collar 40 with friction material 51 which presses against one axial face of that loose collar; a second collar 52 which is provided with longitudinal slots 53 for receiving a cross-pin 54 in the drive shaft 26, so that the collar 52 is rotatably fixed but longitudinally movable on said drive shaft, the collar 52 being faced with friction material 55 for frictionally engaging the adjacent end of the inner part of the loose collar 41; and a compression spring 56 which acts between the collars 50 and 52 to press them apart, and thus to press their frictional members 51 and 55 against the loose collars 40 and 41.

Because of this frictional engagement, the drive shaft 26 drives the feed roller 23 under normal conditions. The frictional connection, however, permits adjustment of the feed roller 23 without moving the shaft 26, as by the operator's turning the knurled wheel 45 to adjust the record sheet when a new supply roll is started, and in addition permits the shaft 26 to turn without movement of the feed roller 23, and without causing breakage, if some emergency occurs which makes that necessary.

The re-roll roller 24 has a hole 60 in one axial end for receiving a stud 61 from a driving disk 62 carried and driven by the shaft 27; and has a trunnion 63 at the other axial end. The trunnion 63 is rotatably mounted in a hole in a hinged finger 64, suitably hinged between two fingers 65 of a U-shaped carrying plate fastened to the partition 13. A coiled spring 66 around the hinge pin 67 of the finger 64 serves to spring-press the forward or roller-carrying end of such finger toward the re-roll roller 24, or to the full line position shown in Fig. 4. This hinged finger 64 may be swung outward, or to the right in Figs. 2, 4, and 7, to disengage it from the trunnion 63, thus permitting the re-roll roller 24 to be disengaged from the stud 61 and removed to take off a re-wound roll of record sheet and to start the re-winding of a new roll.

The forward end of the finger 64 projects slightly, as is clear from Figs. 1 and 4, to facilitate its operation by the thumb or finger of the operator. The rear end of the finger 64 co-operates with a forwardly turned finger 68 of the same U-shaped member that carries the arms 65, to limit the spring-pressed swinging of the arms 64; which serves the double purpose of preventing friction due to end pressure of the finger 64 against the re-roll roller 24 and of holding the spring-pressed finger in proper place for the insertion of the re-roll roller 24 when that roller has been removed. The turned forward end of the spring-pressed finger 64 also serves the additional function of a cam-plate co-operating with the trunnion 63 to force the finger to the right when the re-roll roller 24 is to be put back in place, thus avoiding the necessity for manually moving the finger 64 to the right as a separate operation.

The left-hand end of the re-roll roller 24 (Figs. 7, 8, and 9) co-operates with a driving and gripping finger 70, which is bent from the driving disk 62 to the right (Fig. 7) into close proximity to the surface of the re-roll roller 24. This end of the re-roll roller preferably has a flat portion 71, (Figs. 3 and 7,) which facilitates the insertion of the edge of the record sheet 16 between the finger 70 and the re-roll roller 24 so that by relative turning between such finger and re-roll roller the sheet may be gripped between them. If desired, the hole 60 in the left-hand end of the re-roll roller 24 may be made slightly eccentric with respect to the periphery of the roller, although if this is done it is usually by an amount too small to be illustrated on the drawings. Such eccentricity, if used, co-operates with the notched or flattened part 71 to facilitate the gripping action of the finger 70 on the record sheet. The finger 70, which is desirably resilient to further the gripping action referred to, is also the driving finger through which the driving disk 62 drives the re-roll roller 24.

As a result of these various features of construction, it is possible to put a new roll of record sheet in place and to adjust it much more quickly and easily than has ever heretofore been possible.

These same general features of construction may be used in multiple meters, such as a duplex meter as shown in Figs. 10, 11, and 12, where the feed rollers and the re-roll rollers respectively of a plurality of meters are driven in common by the same clock-work mechanisms, one for all the feed rollers and another for all the re-roll rollers. Such clock-work mechanisms are contained in a sub-case 25, as already described, and operate a power shaft 26 for the several feed rollers and a power shaft 27 for the several re-roll rollers. I have shown this multiple meter in the form of a duplex meter, for the sake of avoiding the complications that would be involved in showing it in a construction where there were more than two meters with clock-work mechanisms for operating the record sheets in common; but this simplicity of showing is not a limitation to precisely two as the number of record sheets which may be so operated.

In such duplex meter, the power shaft 26 for the feed rollers drives two feed rollers 23ª and 23ᵇ, which in turn operate the two record sheets 16ª and 16ᵇ. The construction within the feed roller 23ᵇ is substantially the same as that shown in Fig. 5 as within the feed roller 23, save that a sleeve 80 loose on the shaft 26 projects to the left from the loose collar 40 which carries the left-hand end of the feed roll 23ᵇ, to which loose collar such sleeve 80 is fixed by a set-screw 81. The feed roll 23ª, however, is carried by two loose collars 82 and 83, which are fixed to such feed roll but are loose on the shaft 26 and on the sleeve 80 respectively. The loose collar 83 has a sleeve 84 interposed between it and the sleeve 80, to which sleeve 84 the loose collar 83 is clamped by a set-screw 85. The sleeve 84 at its right-hand end (Fig. 11) has a circumferential flange 86; and is made of friction material so that there is a frictional engagement between such flange 86 and the adjacent end of the loose collar 40 of the feed roll 23ᵇ. A compression spring 87 acts between the loose collar 83 and a collar 88 fixed on the left-hand end of the sleeve 80; which spring 87 tends to hold the flange 86 against the loose collar 40 to provide a frictional drive from the feed roll 23ᵇ to the feed roll 23ª.

Thus in this construction, the feed roll 23ᵇ is driven from the shaft 26 through a friction drive which permits adjustment of that feed roll 23ᵇ with respect to its driving shaft 26; and the feed roll 23ª is driven from the feed roll 23ᵇ through a frictional connection which permits adjustment of the feed roll 23ª with respect to the feed roll 23ᵇ. This permits the ready adjustment of the two feed rolls 23ª and 23ᵇ with respect to each other and to the driving shaft to adjust the two record sheets independently as may be desired or necessary to suit the actual time and to bring them into accord with each other.

In such duplex meter, the power shaft 27 drives two re-roll rollers 24ª and 24ᵇ, as is clear from Fig. 12. The driving of the re-roll roller 24ª is direct from the drive shaft 27 by a construction which has already been described in connection with the simple or single meter and which is shown in Fig. 7, with the driving disk 62 fixed on the drive shaft 27 and provided with a driving and gripping finger 70 which co-operates with a notch or flattened portion 71 in the left-hand end of the re-roll roller 24ª, which re-roll roller is supported at its left-hand end on the stud 61 from the driving disk 62. This permits the re-roll roller 24ª to be turned with respect to the driving shaft 27 to grip and release the corner of the record sheet 16ª, which at its advancing end is desirably cut off slightly obliquely, as is clear from Fig. 12.

The re-roll roller 24ᵇ is driven from the re-roll roller 24ª, through a friction drive which permits relative adjustment between the two re-roll rollers and also permits the turning of the re-roll roller 23ᵇ to grip and release the record sheet 16ᵇ. To this end, a sub-shaft 90 is loosely mounted within the right-hand end of the re-roll roller 24ª, and projects on loosely through the re-roll roller 24ᵇ into co-operation at its right-hand end with a hinged finger 64 such as has already been described. By swinging the finger 64 outward, the two re-roll rollers 24ª and 24ᵇ may be removed as a unit, and the re-wound rolls of record sheet slipped therefrom.

The sub-shaft 90 is frictionally driven from the re-roll roller 24ª. To this end, a compression spring 91 acts between a collar 92 at the left-hand end of the sub-shaft 90 and a slidable collar 93, which latter bears frictionally against the inner end of the hole 60ª which is provided in the re-roll roller 24ª for the stud 61 and for such spring 91. By reason of this construction, as the re-roll roller 24ª is turned, it turns the sub-shaft 90 with it through the friction drive between the collar 93 and the end of the hole 60ª; but permits the sub-shaft 90 to be turned as desired within the re-roll roller 24ª.

The sub-shaft 90 serves as a driving shaft for the re-roll roller 24ᵇ, in substantially the same way that the driving shaft 27 serves as a driving shaft for the re-roll roller 24$^a$ or 24. To this end, a stud 61$^b$ is pinned to the sub-shaft 90 in position to project into a hole 60$^b$ at the left-hand end of the re-roll roller 24$^b$. This stud 61$^b$ carries a disk 62$^b$ which has a gripping and driving finger 70$^b$; which cooperates with a notch or flattened portion 71$^b$ at the left-hand end of the re-roll roller 24$^b$ to grip or release as desired one edge of the advanced end of the record sheet 16$^b$.

I claim as my invention:

1. A re-roll roller for record sheet in a graphic meter, comprising a part by which said roller is adapted to be driven, said part including a supporting stud and a finger spaced therefrom, and a hole in one end of said re-roll roller into which said stud projects, there being different thicknesses of wall between the stud and the exterior of the roller at that end whereby relative rotation between the stud and roller varies the space between the surface of the roller and the finger.

2. A re-roll roller for record sheet in a graphic meter, comprising a part by which said roller is adapted to be driven; said part including a supporting stud and a finger spaced therefrom, a hole in one end of said re-roll roller into which said stud projects, said hole being eccentric and the roller being rotatable on said stud to provide a gripping device between the roller and said finger operable by said rotatable adjustment.

3. A re-roll roller for record sheet in a graphic meter, comprising a part by which said roller is adapted to be driven; said part including a supporting stud and a finger spaced therefrom, a hole in one end of said re-roll roller into which said stud projects, said hole being eccentric and the roller being rotatable on said stud to provide a gripping device between the roller and said finger operable by said rotatable adjustment, and said roller having a flattened place at its surface at such stud-receiving end and at the thinnest portion of the wall between said eccentric hole and the exterior of the roller.

4. A re-roll roller for record sheet in a graphic meter, comprising a part by which said roller is adapted to be driven, said part including a supporting stud and a finger spaced therefrom, and a hole in one end of said re-roll roller into which said stud projects, and a flattened place on the outer surface of said roller at such end to provide opposite such finger an opening which can be closed to pinch the record sheet in it by the rotation of said re-roll roller relatively to said stud.

5. A feed roller for record sheet in a graphic meter, comprising a hollow cylinder, a collar fixed to each end of said cylinder and loosely mounted on a shaft, a pair of friction members rotatably fixed on said shaft within said cylinder and spring pressed against said collars to provide a frictional driving connection between said shaft and said roller, one of said collars being provided with an outwardly projecting trunnion for supporting one end of said roller, said trunnion having a handle at its end whereby said roller may be adjusted on said shaft.

6. A feed roller for record sheets in a graphic meter which produces separate graphs on a plurality of record sheets, comprising a hollow cylinder, a collar fixed at each end of said cylinder and loosely mounted on a shaft, a pair of friction members rotatably fixed on said shaft within said cylinder and spring pressed toward the inner sides of said collars, a sleeve on said shaft and fixed to one of said collars and projecting outward therefrom, a second cylinder, collars fixed at each end of said second cylinder, one of said collars being loosely mounted on said sleeve and spring pressed toward the collar of said first mentioned cylinder to which said sleeve is fixed to provide a frictional driving connection between said two cylinders.

7. A re-roll roller for record sheets in a graphic meter which produces separate graphs on a plurality of record sheets, comprising a cylindrical roller, a part by which said roller is adapted to be driven, said part being rotatable with respect to said roller to provide a gripping device for a record sheet, a second roller and a part by which it is adapted to be driven and which is rotatable therewith to provide a gripping device for a second record sheet, and a frictional driving connection between said first roller and the driving part for the second roller.

In witness whereof, I have hereunto set my hand at Indianapolis, Indiana, this 22d day of October, A. D. one thousand nine hundred and twenty-eight.

DONALD J. ANGUS.